United States Patent [19]
Gavrilovic et al.

[11] Patent Number: 5,295,146
[45] Date of Patent: Mar. 15, 1994

[54] SOLID STATE GAIN MEDIUMS FOR OPTICALLY PUMPED MONOLITHIC LASER

[75] Inventors: Pavle Gavrilovic, Brockton; Shobha Singh, Chestnut Hill, both of Mass.

[73] Assignee: Polaroid Corporation, Cambridge, Mass.

[21] Appl. No.: 75,861

[22] Filed: Jun. 11, 1993

Related U.S. Application Data

[63] Continuation-in-part of Ser. No. 866,444, Apr. 10, 1992, abandoned.

[51] Int. Cl.$^5$ .................................. H01S 3/16
[52] U.S. Cl. .............................. 372/41; 372/21; 372/22; 372/75
[58] Field of Search ............. 372/41, 21, 22, 75, 372/39; 252/301.4 R

[56] References Cited

U.S. PATENT DOCUMENTS

| | | | |
|---|---|---|---|
| 3,949,320 | 4/1976 | Castleberry et al. | 331/94.5 F |
| 3,999,145 | 12/1976 | Gilman et al. | 331/94 |
| 4,723,257 | 2/1988 | Baer et al. | 372/108 |
| 4,797,893 | 1/1989 | Dixon | 372/66 |
| 4,860,304 | 8/1989 | Mooradian | 372/92 |
| 4,942,582 | 7/1990 | Kintz et al. | 372/18 |
| 4,942,587 | 7/1990 | Suzuki | 372/71 |
| 4,998,256 | 3/1991 | Ohshima et al. | 372/32 |
| 5,063,566 | 11/1991 | Dixon | 372/41 |
| 5,070,507 | 12/1991 | Anthon | 372/41 |
| 5,140,604 | 8/1992 | Alabanche et al. | 372/41 |
| 5,166,948 | 11/1992 | Gavrilovic et al. | 372/41 |
| 5,173,911 | 12/1992 | Faure et al. | 372/41 |

OTHER PUBLICATIONS

"Single-frequency microchip Nd lasers" by Zayhowski et al., *Optics Letters*, vol. 14, No. 1, 1 Jan. 1989, pp. 24–26.

"Single-mode oscillation of laser-diode-pumped Nd:YVO$_4$ microchip lasers" by Taira eta l., *Optics Letters*, vol. 16, No. 24, 15 Dec. 1991, pp. 1955–1957.

"Spectroscopic studies and analysis of the laser states of Nd$^{3+}$" in YVO$_4$ by Yaney et al., *Journal of the Optical Society of America*, vol. 66, No. 12, Dec. 1976, pp. 1405–1414.

"Highly efficient Nd:YVO$_4$ diode-laser end-pumped laser" by Fields et al., *Applied Physics Letters*, vol. 51, No. 23, 7 Dec. 1987, pp. 1885–1886.

*Primary Examiner*—James W. Davie
*Attorney, Agent, or Firm*—Robert A. Sabourin; Edward S. Roman

[57] ABSTRACT

Novel solid state gain mediums provide monolithic lasers with short cavity lengths and with the ability to efficiently lase in the lowest order TEM$_{00}$ mode. Unoptimized optical power conversion efficiency of 35% has been achieved with the novel solid state gain mediums in monolithic lasers that have a cavity length as short as 0.5 mm. With proper values for the output mirror reflectivity and low loss host crystals, the optical power conversion efficiency is approximately 50%. Moreover, when in optical contact with a frequency doubling optically non linear crystal, the novel solid state gain mediums in the monolithic lasers can produce coherent visible light.

19 Claims, 4 Drawing Sheets

SOLID STATE GAIN MEDIUMS FOR OPTICALLY PUMPED MONOLITHIC LASER

This is a continuation-in-part of application Ser. No. 07/866,444 filed Apr. 10, 1992, now abandoned.

FIELD OF THE INVENTION

This invention relates generally to novel lasers and, more specifically, to novel host crystal-ion combinations which can be used as solid state gain mediums in optically pumped monolithic lasers which have very short cavity lengths and which efficiently lase in the lowest order $TEM_{00}$ mode.

BACKGROUND OF THE INVENTION

For the past twenty years, optically pumped solid state lasers have found widespread application as a source of coherent radiation. In applications that require lasers that have very short cavity lengths (hereafter referred to as "microlasers"), the preferred solid state gain medium has been neodymium doped yttrium aluminum garnet ($Nd:Y_3Al_5O_{12}$) (hereafter referred to as "Nd:YAG") because of the composition's advantageous physical characteristics. 1% Nd:YAG has a maximum Nd-ion absorption coefficient at pump wavelengths between 0.8 to 0.82 micrometers of approximately 8 inverse centimeters. This allows a laser that employs Nd:YAG as the solid state gain medium to have short cavity lengths, as short as 2.5 millimeters, and yet still have 99% pump light absorption. Moreover, the stimulated emission cross section of Nd:YAG for the transition at 1.06 micrometers is relatively high, $4.6 \times 10^{-19}$ centimeters$^2$. This translates into low lasing thresholds and high gain which are both important considerations for microlasers which have a low gain length compared to conventional solid state lasers.

Nonetheless, despite Nd:YAG's advantageous physical characteristics, research into the physical characteristics of other complex host crystal-ion combinations for use as solid state gain mediums in lasers is continuing.

SUMMARY OF THE INVENTION

With the foregoing in mind, it is an object of the present invention to provide a monolithic microlaser that employs novel host crystal-ion combinations as the solid state gain medium and has an ion absorption coefficient that allows for very short cavity lengths while maintaining 99% pump light absorption.

It is a further object of the present invention to provide a monolithic microlaser that employs novel host crystal-ion combinations as the solid state gain mediums and has stimulated emission cross sections for the infrared transitions which are substantially greater than the corresponding stimulated emission cross section associated with Nd:YAG for the transition at 1.06 micrometers.

It is yet another object of the present invention to provide a monolithic microlaser that employs novel host crystal-ion combinations as the solid state gain mediums and has a greater lasing efficiency than a monolithic microlaser which employs Nd:YAG as the solid state gain medium.

According to this invention, the foregoing objects are achieved by several host crystal-ion combinations that are employed as a solid state gain medium in monolithic lasers. The host crystal-ion combinations are selected from a group of host crystal-ion combinations represented by the atomic formulas: $Y_{1-x}R_xVO_4$ where R is a dopant comprising at least one of cerium, praseodymium, promethium, samariu, europium, gadolimium, terbium, dysprosium, holmium, erbium, thulium and ytterbium, and X is a value in the range from 0.005 to 0.07; $Y_{3(1-x)}R_{3x}Al_5O_{12}$ where R is a dopant comprising at least one of cerium, praseodymium, promethium, samarium, europium, gadolinium, terbium, dysprosium, holmium, erbium, thulium and ytterbium, and X is a value in the range from 0.005 to 1.0; $La_{2(1-x)}R_{2x}O_2S$ where R is a dopant comprising at least one of cerium, praseodymium, neodymium, promethium, samarium, europium, gadolinium, terbium, dysprosium, holmium, erbium, thuliaum and ytterbium, and X is a value in the range from 0.005 to 0.10; and $La_{1-x}R_xZ_3$ where R is a dopant comprising at least one of cerium, praseodymium, neodymium, promethium, samarium, europium, gadolinium, terbium, dysprosium, holmium, erbium, thulium and ytterbium, Z is a halogen selected from the group consisting of chlorine and bromine, and X is a value in the range from 0.005 to 1.0.

When employed in an optically pumped monolithic microlaser as the novel solid state gain medium, the novel host crystal-ion combination is disposed between two reflecting surfaces which are either (a) in the form of coatings directly deposited on the solid state gain medium or (b) separate elements bonded onto opposite sides of the solid state gain medium. Optical pumping is provided by any appropriate source such as a semiconductor injection laser or laser array. An unoptimized monolithic microlaser formed in accordance with this invention had a 0.5 millimeter cavity length and a 99% pump light absorption lased infrared light in the lowest order $TEM_{00}$ mode when irradiated with pump radiation having a wavelength between 790 to 825 nanometers. An unoptimized monolithic microlaser which employed neodymium doped lanthanum oxysulfide as the solid state gain medium had a stimulated emission cross section of $20 \times 10^{-19}$ centimeters$^2$ for the transition at 1.06 micrometers. Moreover, in all the host crystals except for the yttrium aluminum garnet ($Y_3Al_5O_{12}$) host, the lasing output light will be polarized along the optic axis.

In an embodiment for the generation of visible coherent light, the solid state gain medium is in optical contact with an optically nonlinear crystal that is a frequency doubler and has low optical loss at a fundamental and second harmonic frequency. A surface opposite the optical contact in the solid state gain medium and in the optically nonlinear crystal are both coated with a highly reflective material. When irradiated with pump radiation having a wavelength between 790 to 825 nanometers, the preferred embodiment of the microlaser lases either green or blue light depending on which of the novel host crystal-ion combinations is employed as the solid state gain medium. The lasing efficiency, which is defined as the pump power in to the lasing power out, for the microlaser which generates visible coherent light is estimated to be approximately 10%.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENTS

A family of novel host crystal-ion combinations in accordance with this invention can be employed as a solid state gain medium in a monolithic microlaser of this invention to be hereinafter described. The family of novel host crystal-ion combinations are a group of host crystal-ion combinations represented by the atomic formulas: $Y_{1-x}R_xVO_4$ where R is a dopant comprising at least one of cerium, praseodymium, promethium, samarium, europium, gadolinium, terbium, dysoprosium, holmium, erbium, thulium and ytterbium, and X is a value in the range from 0.005 to 0.07; $Y_{3(1-x)}R_{3x}Al_5O_{12}$ where R is a dopant comprising at least one of cerium, praseodymium, promethium, samarium, europium, gadolinium, terbium, dysprosium, holmium, erbium, thulium and ytterbium and X is a value in the range from 0.005 to 01.0; $La_{2(1-x)}R_{2x}O_2S$ where R is a dopant comprising at least one of cerium, praseodymium, neodymium, promethium, samarium, europium, gadolinium, terbium, dysprosium, holmium, erbium, thulium and ytterbium, and X is a value in the range from 0.005 to 0.10; and $La_{1-x}R_xZ_3$ where R is a dopant comprising at least one of cerium, praseodymium, neodymium, promethium, samarium, europium, gadolinium, terbium, dysprosium, holmium, erbium, thulium and ytterbium, Z is a halogen selected from the group consisting of chlorine and bromine, and X is a value in the range from 0.005 to 1.0;

Preparation of any of the novel host crystal-ion combinations discussed above may be carried out by a number of preparatory techniques known to all those familiar with crystal growth. A procedure found suitable for preparation of a neodymium doped lanthanum oxysulfide (Nd:La$_2$O$_2$S) is set forth below.

Single crystals of neodymium doped lanthanum oxysulfide were prepared by slowly cooling a melt using a Centorr vacuum/atmosphere tungsten mesh furnace. The starting material (Nd:La$_2$O$_2$S) was obtained from the General Electric Corporation, Chemical Products -Business Section, Cleveland, Ohio. The melts were contained in either tungsten or iridium ampoules of standard Bridgeman form, 0.5 inch diameter by 3 inches long. A typical run consists of evacuating the furnace chamber with the sample in place and back filling with gettering Argon to approximately 30 inches of Hg. The temperature was then raised to the melting point of approximately 2150° C. A loose fitting cover on the top of the ampoule was used to minimize the evolution of sulfur from the melt. After the charge was observed to have fully melted, the temperature was reduced at a constant rate of approximately 1° C./hr and, once the charge solidified, the furnace was cooled down to room temperature. The crystals obtained by the above described method were normally slightly reduced as a result of the sulfur loss. Annealing in an H$_2$S atmosphere at 1200° C. for approximately 18 hours rendered reoxidized transparent crystals of good optical quality.

Figure 1:
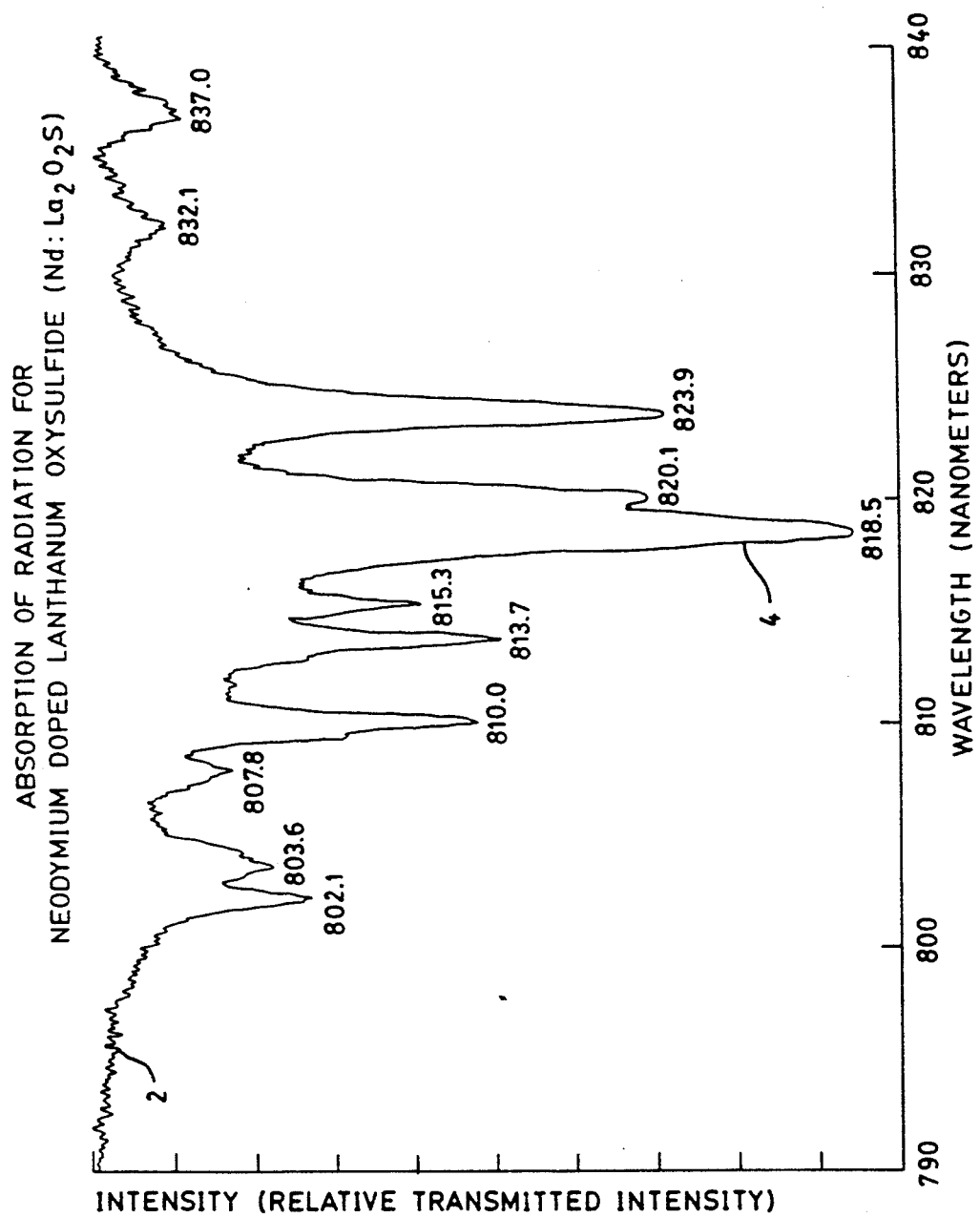
FIG. 1 is a graph illustrating the absorption of radiation by one of the novel host crystal-ion combinations of the invention as a function of wavelength.
Figure 2:
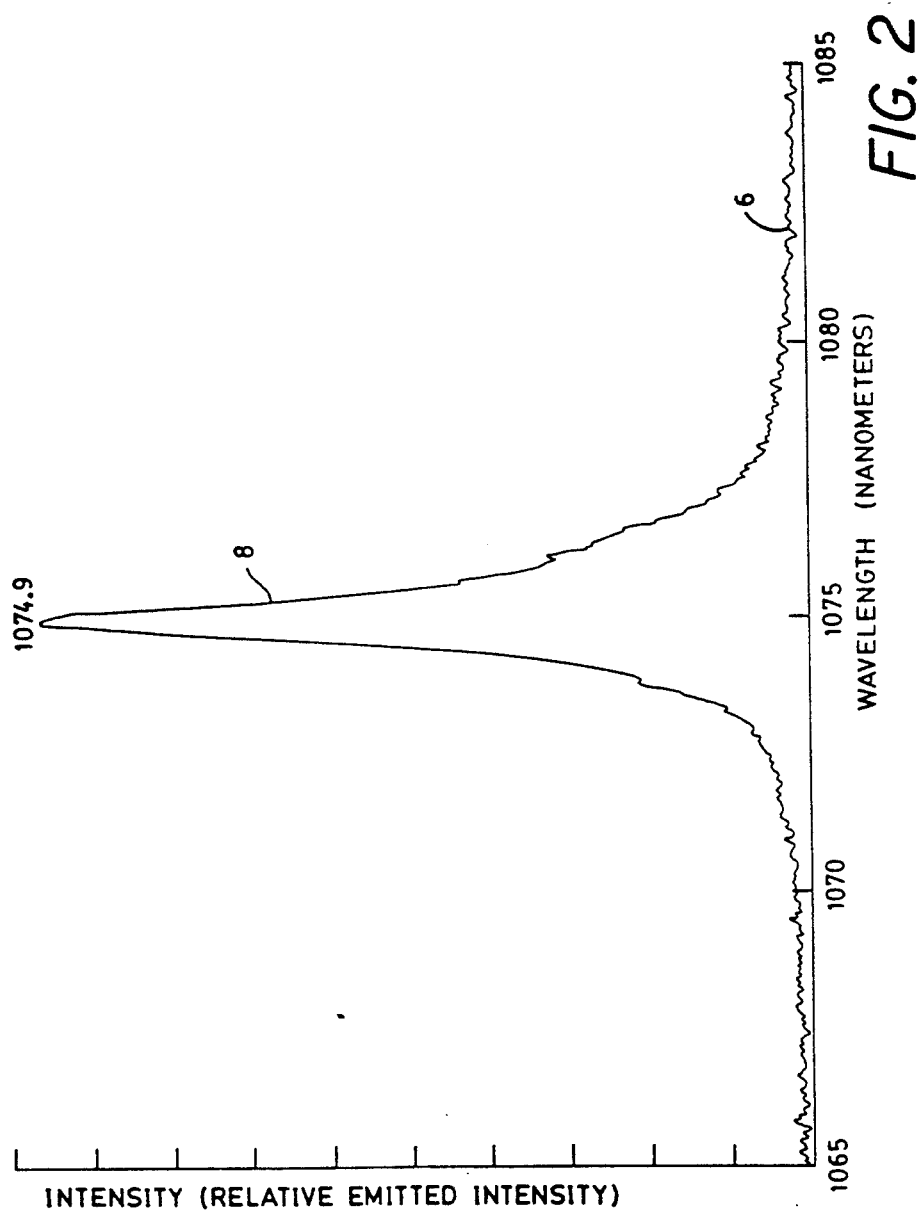
FIG. 2 is a graph illustrating the emission of radiation by one of the novel host crystal-ion combinations of the invention as a function of wavelength.

Referring to FIG. 1, an absorption curve 2 shows the relative transmitted intensity versus wavelength characteristics for one of the novel host crystal-ion combinations of the invention, namely, neodymium doped lanthanum oxysulfide (Nd:La$_2$O$_2$S), which is employed as the solid state gain medium in a monolithic microlaser of this invention to be hereinafter described. Specifically, the absorption curve 2 shows that for the $\pi$ polarization neodymium doped lanthanum oxysulfide absorbs radiation in several transmission diode pump bands between 802 to 837 nanometers and most strongly absorbs radiation at 818.5 nanometers, hereafter, known as the pump absorption region 4. Referring now to FIG. 2, an emission curve 6 shows the relative emission intensity versus wavelength characteristics for the $\pi$ polarization for neodymium doped lanthanum oxysulfide employed as the solid state gain medium in the monolithic microlaser of this invention to be hereinafter described. The emission curve 6 shows that neodymium doped lanthanum oxysulfide emits infrared light, namely, a narrow radiation band 8 centered at about 1075 nanometers. This also corresponds to a lasing transition to be explained fully below.

Figure 3:
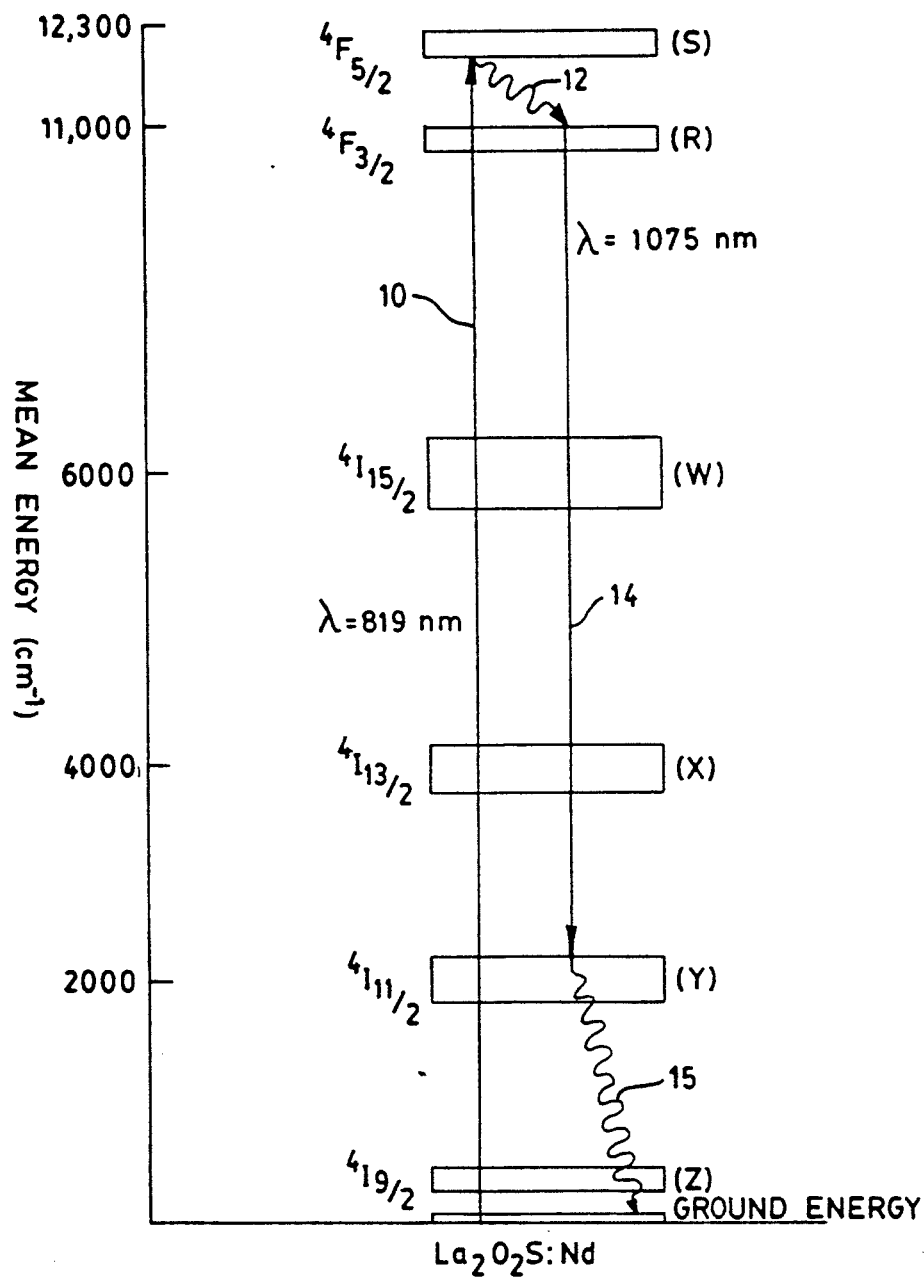
FIG. 3 is an energy level diagram of one of the novel host crystal-ion combinations of the invention wherein the ordinate is in units of wave number.

FIG. 3 shows the energy level diagram for neodymium doped in lanthanum oxysulfide. Moving horizontally from left to right in FIG. 3, the energy level diagram contains (a) an ordinate scale in mean energy, (b) a spectroscopic notation for each quantum energy state of the neodymium atom, (c) an energy band associated with each quantum energy state, and (d) a shorthand letter designation for each energy band. In the energy diagram, a first transition 10, a transition from ground to S, indicates an excitation and a raising of a portion of the neodymium atoms from the ground energy level to the S energy level. This also corresponds in FIG. 1 to the pump absorption region 4 centered around 818.5 nanometers.

Referring once again to FIG. 3, the S energy band is close in energy to a lower lying R energy band which indicates that neodymium atoms can efficiently relax from the S energy band to the R energy band with a short lifetime. That is, atoms at the S energy band remain at the S band for a very short period of time before decaying to the next lower lying energy band. In FIG. 3, the neodymium atoms remain at the S energy band for a short period of time and then they partially relax in energy, as shown by transition 12, to the R energy band. Partial relaxation is the mechanism by which atoms transfer vibrational (heat) energy in the form of phonons to the host crystal lattice. As can be seen from FIG. 3 again, the R energy band has no lower lying energy bands within close proximity which indicates that the R energy band has a relatively long lifetime. From the R energy band, the neodymium atoms then significantly relax in energy, as shown in the down transition 14, to the Y energy band and emit photons in the form of infrared emissions at 1075 nanometers. This is also the lasing transition which corresponds in FIG. 2 to the narrow radiation band 8 centered about 1075 nanometers. Finally, from the Y energy band, the neodymium atoms then relax in energy, as shown in transition 15, to the ground energy band.

Figure 4:
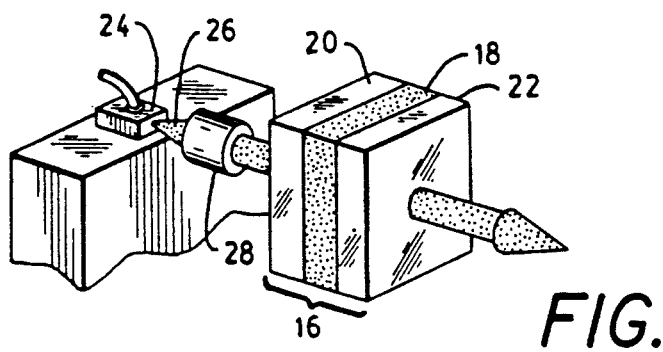
FIG. 4 is a perspective view of a first embodiment of a monolithic microlaser according to the present invention.

Referring now to FIG. 4, a monolithic microlaser 16 is disclosed which is optically pumped, which employs the novel host crystal-ion combinations of this invention as the solid state gain medium, and produces radiation which is characteristic of the doping ion in the host crystal. Any of the rare earth dements listed herein provide the proper doping charactertics. Specifically, a solid state gain medium 18 is disposed between a first reflecting surface 20 and a second reflecting surface 22 so as to form the monolithic microlaser 16. The first reflecting surface 20 and the second reflecting surface 22 may either be deposited as coatings directly on opposing surfaces of the solid state gain medium 18 or made using thin glass mirrors or other appropriate material and subsequently bonded to the solid state gain medium 18 to form a sandwich structure. The first reflecting surface 20 when deposited directly on the solid state gain medium 18 as an input coating is of a type that is highly transmissive at the pump wavelength and highly reflective at the lasing wavelength. Similarly, the second reflecting surface 22 when deposited directly on the solid state gain medium 18 as an output coating is of a type that is highly reflective at the pump wavelength and partially transmissive at the lasing wavelength. The minimum cavity length of the monolithic microlaser 16 depends on which novel host crystal-ion combination is employed as the solid state gain medium 18. For example, a monolithic microlaser which employs neodymium doped lanthanum oxysulfide as the solid state gain medium can have a cavity length as short as 0.5 millimeters yet still have 99% pump light absorption.

Figure 5:
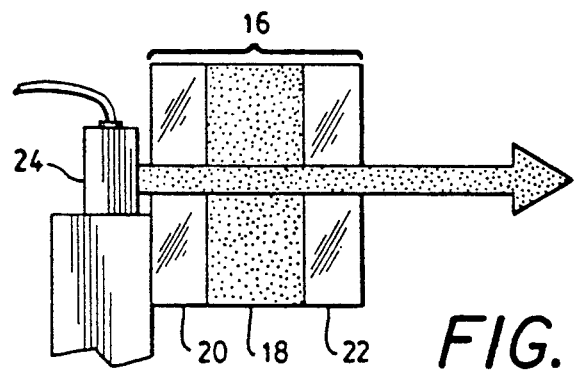
FIG. 5 is a cross-sectional view of the first embodiment of the monolithic microlaser with the semiconductor laser diode pump located in close proximity to one of the reflective surfaces.

In operation, the monolithic microlaser 16 is excited by an appropriate source such as a semiconductor laser diode or laser array, typically either GaAs or AlGaAs. A semiconductor laser diode 24 is shown in FIG. 4 and it includes an output facet (not shown) that has a facet coating reflectivity of greater than 5%. This prevents back reflection of a pump beam 26 from the first reflective surface 20 from affecting the performance of the semiconductor laser diode 24. The pump beam 26 from the semiconductor laser diode 24 is focused by an optical focusing system 28, typically, a combination of a long focal length spherical lens followed by a short focal length cylindrical lens, which optically pumps the monolithic microlaser 16. The monolithic microlaser 16 then lases infrared light in the $TEM_{00}$ mode. Presently, the lasing efficiency of the unoptimized monolithic microlaser 16 is approximately 35% and, with optimization, lasing efficiencies of approximately 50% are expected. In all the host crystals except for the yttrium aluminum garnet ($Y_3Al_5O_{12}$) host, the lasing output light will be polarized along the optic axis of the host crystal. Alternatively, as shown in FIG. 5, the semiconductor laser diode 24 may also be in close proximity to the first reflecting surface 20 of the monolithic microlaser 16 so that there is no intervening optics therebetween.

Figure 6:
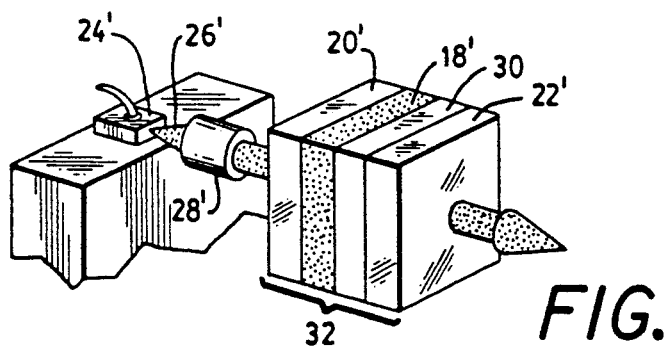
FIG. 6 is a perspective view of a second embodiment of a monolithic microlaser according to the present invention.

Referring now to FIG. 6 where like numerals designate previously described elements, another embodiment of a monolithic microlaser 32 is disclosed which is optically pumped, employs the novel host crystal-ion combinations as the solid state gain medium, and produces radiation which is half the wavelength of the characteristic wavelength of the doping ion in the host crystal. Specifically, a solid state gain medium 18' is disposed in optical contact with an optically nonlinear crystal 30, typically $Ba_2Na_2Nb_5O_{15}$, $KNbO_3$, $LiNbO_3$, $KTiOPO_4$, or any other suitable frequency doubling crystals, which has low optical loss at both the fundamental frequency and at the second harmonic frequency. The solid state gain medium 18' and optically nonlinear crystal 30 pair are disposed between a first reflecting surface 20' and a second reflecting surface 22' so as to form the monolithic microlaser 32. The first reflecting surface 20' and the second reflecting surface 22' may be deposited as coatings directly on respective opposing outside surfaces of the solid state gain medium 18' and optically nonlinear crystal 30 pair. Alternatively, the first reflecting surface 20' and the second reflecting surface 22' may be made using thin glass mirrors or other appropriate material and subsequently bonded to the solid state gain medium 18' and optically nonlinear crystal 30 pair to form a sandwich structure. The first reflecting surface 20' when deposited directly on the solid state gain medium 18' as an input coating is of a type that is highly transmissive at the pump wavelength and highly reflective at the lasing and the second harmonic frequencies. Similarly, the second reflecting surface 22' when deposited directly on the optically nonlinear crystal 30 as an output coating is of the type that is highly reflective at the pump wavelength, highly reflective at the fundamental frequency, and highly transmissive at the second harmonic frequency.

Figure 7:
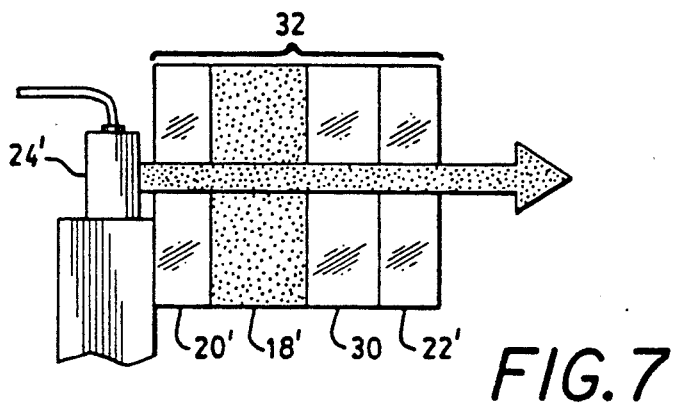
FIG. 7 is a cross-sectional view of the second embodiment of the monolithic microlaser with the semiconductor laser diode located in close proximity to one of the reflective surfaces.

In operation, the monolithic microlaser 32 is excited by an appropriate source such as a semiconductor laser diode or laser array, typically either GaAs or AlGaAs. A semiconductor laser diode 24' is shown in FIG. 6 and it includes an output facet (not shown) that has a facet coating reflectivity of greater than 5%. This is to prevent back reflection of a pump beam 26' from the first reflective surface 20' from affecting the performance of the semiconductor laser diode 24'. The pump beam 26' from the semiconductor laser diode 24' is focused by an optical focusing system 28', typically, a combination of a long focal length spherical lens followed by a short focal length cylindrical lens, which optically pumps the monolithic microlaser 32. The monolithic microlaser 32 then lases visible light in the $TEM_{00}$ mode. The color associated with the visible light is dependant on which of the novel host crystal-ion combinations is employed as the solid state gain medium. For example, when ytterbium doped yttrium vanadate ($Yb:YVO_4$) or ytterbium doped yttrium aluminum garnet ($Yb:Y_3Al_5O_{12}$) are employed as the solid state gain medium, the monolithic microlaser is expected to lase light in the 450 to 490 nanometer range while, when neodymium doped lanthanum oxysulfide ($Nd:La_2O_2S$) or neodymium doped lanthanum chloride or bromide ($Nd:LaZ_3$) employed as the solid state gain medium, the monolithic microlaser is expected to lase light in the 490 to 555 nanometer range. The lasing efficiency of the optimized monolithic microlaser 32 is expected to be approximately 10%. Alternatively, as shown in FIG. 7, the semiconductor laser diode 24' may also be in close proximity to the first reflecting surface 20' of the monolithic microlaser 32 so that there is no intervening optics therebetween.

In the case where the absorption length of the pump laser radiation is longer than the length of the solid state gain medium, an enhancement of the pump laser absorption can be made by placing the solid state gain medium inside a Fabry-Perot type resonator at the pump laser wavelength. For example, referring to FIGS. 4 and 6, the coatings on both the reflective surfaces would have high reflectivity at the pump laser wavelength in addition to being properly coated at the wavelength of the laser material.

The monolithic microlasers 16, 32 can be made quite compact and stable using microfabrication techniques similar to those used in the semiconductor fabrication industry. The design of the monolithic microlaser 16, 32 renders it able to withstand significant shocks for operation under adverse conditions. One application for a monolithic microlaser 16, 32 would be for optical printers which exposes photosensitive material to an image derived from an electrical signal.

Other embodiments of the invention including additions, subtractions, deletions, and other modifications of the preferred disclosed embodiments of the invention will be obvious to those skilled in the art and are within the scope of the following claims.

What is claimed is:

1. A solid state gain medium for a microlaser, said solid state gain medium comprising a host crystal-ion combination having one of the atomic formulas: $Y_{1-x}R_xVO_4$ where R is a dopant comprising at least one of cerium, praseodymium, promethium, samarium, europium, gadolinium, terbium, dysprosium, holmium, erbium, thulium and ytterbium, where X is a value ranging from 0.005 to 0.07; $Y_{3(1-x)}R_{3x}Al_5O_{12}$ where R is a dopant comprising at least one of cerium, praseodymium, promethium, samarium, europium, gadolinium, terbium, dysprosium, holmium, erbium, thulium and ytterbium, where X is a value ranging from 0.005 to 1.0; $La_{2(1-x)}R_{2x}O_2S$ where R is a dopant comprising at least one of cerium, praseodymium, neodymium, promethium, samarium, europium, gadolinium, terbium, dysprosium, holmium, erbium, thulium and ytterbium, and X is a value ranging from 0.005 to 0.10; and $La_{1-x}R_xZ_3$ where R is a dopant comprising at least one of cerium, praseodymium, neodymium, promethium, samarium, europium, gadolinium, terbium, dysprosium, holmium, erbium, thulium and ytterbium, where Z is a halogen selected from the group consisting of chlorine and bromine, and X is a value ranging from 0.005 to 1.0.

2. A solid microlaser of the type that is optically pumped, said solid state microlaser comprising: a first reflecting surface, a second reflecting surface apart from said first reflecting surface, and a solid state gain medium disposed between said first and said second reflecting surfaces, said solid state gain medium comprising a host crystal-ion combination having the atomic formulas: $Y_{1-x}R_xVO_4$ where R is a dopant comprising at least one of cerium, praseodymium, promethium, samarium, europium, gadolinium, terbium, dysprosium, holmium, erbium, thulium and ytterbium, and X is a value ranging from 0.005 to 0.07; $Y_{3(1-x)}R_{3x}Al_5O_{12}$ where R is a dopant comprising at least one of cerium, praseodymium, promethium, samarium, europium, gadolinium, terbium, dysprosium, holmium, erbium, thulium and ytterbium, and X is a value ranging from 0.005 to 1.0; $La_{2(1-x)}R_{2x}O_2S$ where R is a dopant comprising at least one of cerium, praseodymium, neodymium, promethium, samarium, europium, gadolinium, terbium, dysprosium, holmium, erbium, thulium and ytterbium, and X is a value ranging from 0.005 to 0.10; and $La_{(1-x)}R_xZ_3$ where R is a dopant comprising at least one of cerium, praseodymium, neodymium, promethium, samarium, europium, gadolinium, terbium, dysprosium, holmium, erbium, thulium and ytterbium, and Z is a halogen selected from the group consisting of chlorine and bromine, and X is a value ranging from 0.005 to 1.0.

3. The microlaser of claim 2 further comprising an optically nonlinear crystal disposed between said solid state gain medium and one of said first and said second reflecting surfaces, said optically nonlinear crystal having a first crystal surface in optical contact with said solid state gain medium, and a second crystal surface in optical alignment with one of said first and said second reflecting surfaces, said optically nonlinear crystal having a dispersion allowing phase matching.

4. The microlaser of claim 3 wherein said optically nonlinear crystal comprises a frequency doubler having low optical loss at a fundamental frequency and at a second harmonic frequency.

5. The microlaser of claim 2 wherein said first and said second reflecting surfaces are input and output coatings, respectively, deposited on opposing surfaces of said solid state gain medium, said input coating having a low reflectivity at a first wavelength where said solid state gain medium is optically pumped, and said output coating having a high reflectivity at a second wavelength where said solid stat gain medium is optically pumped.

6. The microlaser of claim 2 wherein said first and said second reflecting surfaces comprise separate discrete elements bonded respectively to opposing surfaces of said solid state gain medium.

7. The microlaser of claim 2, further comprising a semiconductor laser diode disposed adjacent to said microlaser for optically pumping said microlaser with radiation at a semiconductor laser diode pump wavelength.

8. The microlaser of claim 7 wherein said semiconductor laser diode comprises an output facet having a facet coating reflectivity greater than 5%.

9. The microlaser of claim 7 wherein said microlaser is bonded to said semiconductor laser diode.

10. The microlaser of claim 9, wherein said first and said second reflecting surfaces are dielectric coatings having high reflectivity at a semiconductor laser diode pump wavelength.

11. The microlaser of claim 2 wherein said solid state gain medium and said first and said second reflecting surfaces form a Fabry-Perot resonator at a lasing wavelength of said microlaser.

12. A solid state microlaser of the type that is optically pumped, comprising:
a) an optically nonlinear crystal comprising a first crystal surface and an opposite second crystal surface, said optically nonlinear crystal being a doubler, having low optical loss at a fundamental frequency and a second harmonic frequency, and having a dispersion allowing phase matching at said fundamental frequency and said second harmonic frequency;
b) a solid state gain medium comprising a first solid state surface, an opposite second solid state surface, and a host crystal-ion combination, said first solid state surface being in optical contact with said first crystal surface, said host crystal-ion combination having one of the atomic formulas: $Y_{1-x}R_xVO_4$ where R is a dopant comprising at least one of cerium, praseodymium, promethium, samarium, europium, gadolinium, terbium, dysprosium, holmium, erbium, thulium and ytterbium, and X is a value ranging from 0.005 to 0.07; $Y_{3(1-x)}R_{3x}Al_5O_{12}$ where R is a dopant comprising at least one of cerium, praseodymium, promethium, samarium, europium, gadolinium, terbium, dysprosium, holmium, erbium, thulium and ytterbium, and X is a value ranging from 0.005 to 1.0; $la_{2(1-x)}R_{2x}O_2S$ where R is a dopant comprising at least one of cerium, praseodymium, neodymium, promethium, samarium, europium, gadolinium, terbium, dysprosium, holmium, erbium, thulium and ytterbium, and X is a value ranging from 0.005 to 1.0; and $La_{1-x}R_xZ_3$ where R is a dopant comprising at least one of cerium, praseodymium, neodymium, promethium, samarium, europium, gadolinium, terbium, dysprosium, holmium, erbium, thulium and ytterbium, and Z is a halogen selected from the group consisting of chlorine and bromine, and X is a value ranging from 0.005 to 1.0;

c) a first reflecting surface disposed in optical alignment with said second solid state surface; and d) a second reflecting surface disposed in optical alignment with said second crystal surface.

13. The microlaser of claim 12 wherein said first and said second reflecting surfaces are input and output coatings, respectively, deposited directly on opposing said first and said second solid state surfaces, said input coating having a high reflectivity at a wavelength where said solid state gain medium is optically pumped, and said output coating having a low reflectivity at a wavelength where said solid state gain medium is optically pumped.

14. The microlaser of claim 12 wherein said first and said second reflecting surfaces comprise separate discrete elements bonded respectively to opposing said first and said second solid state surfaces.

15. The microlaser of claim 12 further comprising a semiconductor laser diode disposed adjacent to said microlaser for optically pumping said microlaser with radiation at a semiconductor laser diode pump wavelength.

16. The microlaser of claim 15 wherein said semiconductor laser diode comprises an output facet having a facet coating reflectivity greater than 5%.

17. The microlaser of claim 15 wherein said microlaser is bonded to said semiconductor laser diode.

18. The microlaser of claim 17 wherein said first and said second reflective surfaces are dielectric coatings having thigh reflectivity at said semiconductor laser diode pump wavelength.

19. The microlaser of claim 12 wherein said solid state gain medium and said first and said second reflective surfaces form a Fabry-Perot resonator at a lasing wavelength of said microlaser.

* * * * *